(12) United States Patent  
Crawford et al.

(10) Patent No.: US 9,038,888 B2  
(45) Date of Patent: *May 26, 2015

(54) FRAUD CONTROL WHEN GRANTING INSTANT CREDIT

(71) Applicant: III HOLDINGS 1, LLC, Wilmington, DE (US)

(72) Inventors: Stacey J. Crawford, Murray, UT (US); Danielle M. Crop, Phoenix, AZ (US); Glade R. Erikson, Glendale, AZ (US); Kristin H. Gomes, State College, PA (US); Sejal D. Vora, Scarsdale, NY (US)

(73) Assignee: III Holdings 1, LLC, Wilmington, DE (US)

(*) Notice: Subject to any disclaimer, the term of this patent is extended or adjusted under 35 U.S.C. 154(b) by 84 days.

This patent is subject to a terminal disclaimer.

(21) Appl. No.: 13/725,792

(22) Filed: Dec. 21, 2012

(65) Prior Publication Data

US 2013/0110562 A1 May 2, 2013

Related U.S. Application Data

(63) Continuation of application No. 11/618,423, filed on Dec. 29, 2006, now Pat. No. 8,336,764.

(60) Provisional application No. 60/761,765, filed on Jan. 25, 2006.

(51) Int. Cl.
*G06F 17/00* (2006.01)
*G06Q 10/02* (2012.01)
*G06Q 40/02* (2012.01)

(52) U.S. Cl.
CPC ............. *G06Q 10/02* (2013.01); *G06Q 40/02* (2013.01); *G06Q 40/025* (2013.01)

(58) Field of Classification Search
CPC .................................. G06Q 30/0226
USPC .................... 235/375, 379; 705/38, 39
See application file for complete search history.

(56) References Cited

U.S. PATENT DOCUMENTS

| 6,144,948 | A  | 11/2000 | Walker et al. |
| 6,941,279 | B1 | 9/2005  | Sullivan |
| 7,364,073 | B2 | 4/2008  | Webb |

(Continued)

OTHER PUBLICATIONS

Notice of Allowance dated Aug. 24, 2012 in U.S. Appl. No. 11/618,423.

(Continued)

*Primary Examiner* — Jamara Franklin
(74) *Attorney, Agent, or Firm* — Meyertons, Hood, Kivlin, Kowert & Goetzel, P.C.

(57) ABSTRACT

Credit applicants may apply for instant credit, and use an instant account number ("IAN") to make purchases after the instant credit has been granted. Fraud control methods may be used in authorizing the instant credit. When the IAN is issued to purchase airline tickets, it can be ensured that the applicant's last name matches the passenger's last name for the airline ticket being purchased, and that the ticket will not be renamed or sold. When the IAN is issued in conjunction with a partner's loyalty or rewards program, the applicant's account information with the rewards program is captured. It is ensured that the applicant has some tenure with the partner and that data submitted by the applicant is consistent with data on file with the partner.

19 Claims, 3 Drawing Sheets

(56) References Cited

U.S. PATENT DOCUMENTS

| | | |
|---|---|---|
| 7,575,154 B2 | 8/2009 | Rothschild |
| 7,953,663 B1 | 5/2011 | LeKachman |
| 2002/0138357 A1 | 9/2002 | Dutta |
| 2004/0030637 A1 | 2/2004 | Robison et al. |
| 2004/0073439 A1 | 4/2004 | Shuster |
| 2004/0158532 A1 | 8/2004 | Breck et al. |
| 2005/0283435 A1 | 12/2005 | Mobed et al. |

OTHER PUBLICATIONS

Advisory Action dated Jul. 27, 2012 in U.S. Appl. No. 11/618,423.
Final Office Action dated May 21, 2012 in U.S. Appl. No. 11/618,423.
Office Action dated Feb. 6, 2012 in U.S. Appl. No. 11/618,423.
Advisory Action dated Jan. 11, 2012 in U.S. Appl. No. 11/618,423.
Final Office Action dated Oct. 21, 2011 in U.S. Appl. No. 11/618,423.
Office Action dated Jun. 15, 2011 in U.S. Appl. No. 11/618,423.
Final Office Action dated Dec. 8, 2010 in U.S. Appl. No. 11/618,423.
Office Action dated Jun. 25, 2010 in U.S. Appl. No. 11/618,423.
Office Action dated Dec. 18, 2009 in U.S. Appl. No. 11/618,423.
Canadian Office Action received Mar. 29, 2012 in Application No. 2640136.
International Preliminary Report on Patentability dated Jul. 29, 2009 in Application No. PCT/US2007/001922.
Exam Report dated Jun. 29, 2011 in New Zealand Application No. 593732.
Examination Report dated Oct. 29, 2009 in Australian Application No. 2007208251.
Examination Report dated Feb. 7, 2011 in Australian Application No. 2007208251.
Examination Report dated Dec. 8, 2010 in Australian Application No. 2007208251.
Examination Report dated Jan. 18, 2010 in New Zealand Application No. 570617.
Examination Report dated May 31, 2011 in New Zealand Application No. 570617.
Office Action dated Mar. 2011 in Mexican Application No. MX/a/2008/009619.
Examination Report dated Jul. 14, 2010 in Great Britain Application No. GB0815082.3.
International Search Report and Written Opinion dated Nov. 28, 2007 in Application No. PCT/US2007/001922.
Office Action dated May 22, 2013 in Canadian Application No. 2,640,136.

FRAUD CONTROL WHEN GRANTING INSTANT CREDIT

CROSS REFERENCE TO RELATED APPLICATIONS

This application is a continuation of, claims priority to and the benefit of, U.S. Ser. No. 11/618,423, filed Dec. 29, 2006 and entitled "FRAUD CONTROL WHEN GRANTING INSTANT CREDIT" The '423 application claims the benefit under 35, U.S.C. §119(e) of U.S. Provisional Patent Application No. 60/761,765, filed Jan. 25, 2006. Both of which are incorporated by reference herein in their entirety.

BACKGROUND

1. Field of the Invention

The present invention relates to controlling fraud when applications for instant credit are granted.

2. Background Art

Credit card applicants often desire an instant decision and instant ability to charge on the credit card (e.g., instant spend) when they submit an application for credit. In one example, applicants are able to immediately utilize the new credit when an instant account number ("IAN") is issued. However, for the credit grantor, authenticating the applicant can be difficult.

A variety of controls have previously been employed by credit grantors to authenticate the IAN applicant. For example, when the application is submitted in person, the grantor can physically check the applicant's identification. Although, such a control does not work over the Internet or telephone. In another example, the grantor can limit the line of credit associated with the IAN. However, various credit partners may require that certain minimum credit lines be approved, which can be inconsistent with this type of fraud control. The grantor may also attempt to authenticate the applicant by asking "out-of-wallet questions" (e.g., "what is your mother's maiden name?"), but the applicant may have privacy concerns and not freely want to give out this information. Also, such out-of-wallet information may be easily available to the fraud perpetrator. Therefore, what is needed is a better way of controlling fraud when issuing IANs.

SUMMARY

In one example, when an IAN is issued in order for an applicant to purchase airline tickets, a verification can be made that the applicant's last name matches at least one of the passengers' last names for the airline tickets being purchased, and it can also be verified that the ticket will not be renamed or sold. Fraud control is achieved when security agents check the name on the ticket against identification presented by the applicant when the applicant uses the airline ticket.

In another example, when an IAN is issued in conjunction with a partner service provider's loyalty or rewards program, the applicant's account information with the rewards program is captured. It is then verified that the applicant has some tenure (e.g., connection or a predetermined length of time) with the partner service provider and that data submitted by the applicant is consistent with data on file for the applicant with the partner service provider. Fraud control is achieved through this dual layer of security because the fraud perpetrator would have to illegally obtain both partner service provider data and personal information about the intended victim.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the embodiments of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
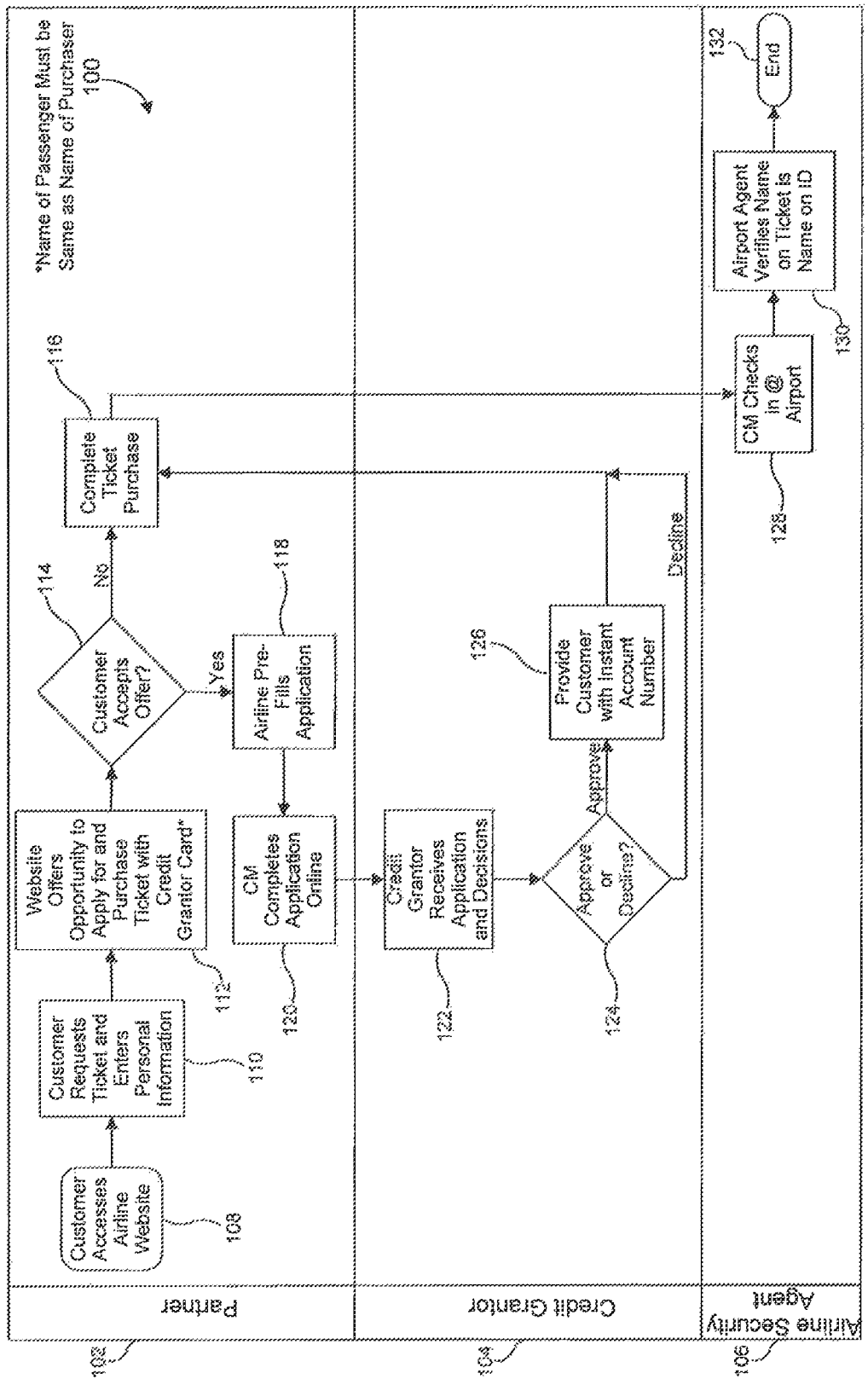
FIG. 1 is a flowchart of an example method of controlling fraud when an IAN is issued in order for an applicant to purchase an airline ticket.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiments) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM);

random access memory (RAM); magnetic disk storage media; optical storage media; flash memory devices; electrical, optical, acoustical or other forms of propagated signals (e.g., carrier waves, infrared signals, digital signals, etc), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for granting instant credit.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. Fraud Control

FIG. 1 is a flowchart illustrating an example fraud control method 100 used when an IAN is issued so that an applicant can purchase an airline ticket. Method 100 ensures (e.g., verifies) that the applicant's last name matches at least one of the passengers' last names for airline tickets being purchased with the IAN, and also ensures that the ticket will not be renamed or resold. FIG. 1 is divided into three lanes 102, 104, and 106. Each lane is assigned to a different party (e.g., partner airline, credit grantor, and airline security agents), and steps that are illustrated in a particular lane are typically performed by the respective party. Partner lane 102 includes steps that are taken by an airline ticketing agency partnering with a credit grantor. Credit grantor lane 104 includes steps that are taken by a credit grantor. Airline security agent lane 106 includes steps that are taken by a security agent when the applicant is at the airport.

In partner lane 102, method 100 begins at step 108, in which the applicant accesses an airline ticketing agency partnering with a credit grantor through, for example, a website or telephone service. Although method 100 will be described using a web-based application procedure, one of skill in the art will recognize that method 100 may also be performed in other ways, such as over the telephone. After step 108, method 100 proceeds to step 110.

In step 110, the applicant requests a ticket from the partner airline ticketing agency. The ticket request is made through the airline company's normal booking procedure. When making the request, the applicant enters the applicant's personal information. Such personal information may include, for example and without limitation, the applicant's name and billing address. After the ticket is requested, method 100 then proceeds to step 112.

In step 112, the partner airline ticketing agency offers the applicant an opportunity to apply for a transaction card with the credit grantor, and then purchase the airline ticket using the new transaction card. The credit grantor may be a credit card company such as, for example, American Express Co. of New York, N.Y. The offer may be made by the airline ticketing agency by means of for example and without limitation, a pop-up window, an embedded advertisement and link, a check box to be selected by the applicant, or an additional webpage between a ticket request webpage and a payment webpage.

In step 114, it is determined whether the applicant accepts the offer to apply for a transaction card. If it is determined in step 114 that the applicant does not accept the offer, method 100 proceeds to step 116, in which the ticket purchase is completed according to the standard procedure followed by the airline. If it is determined in step 114 that the applicant does accept the offer, method 100 proceeds to step 118.

In step 118, the airline ticketing agency pre-fills an instant credit application for the applicant. This can be based on, for example, the personal information entered by the applicant in step 110. In step 120, the applicant completes the instant credit application by filling in any missing information necessary to process the credit request. After step 120, the partner airline ticketing agency forwards the instant credit application to the credit grantor for approval, and method 100 proceeds to step 122.

In credit grantor lane 104, in step 122, the credit grantor receives the instant credit application from the partner airline ticketing agency, along with a request to make a decision regarding the instant credit application. Method 100 then proceeds to step 124.

In step 124, the credit grantor either approves or declines the request for instant credit by the applicant. This decision may be made according to the standard operating procedures of the credit grantor.

If the instant credit application is declined in step 124, method 100 proceeds to step 116. In step 116, the ticket purchase is completed without using an IAN, and the applicant must complete the purchase using some other means of payment.

If the instant credit application is approved in step 124, method 100 proceeds to step 126. In step 126, the credit grantor provides the customer with an IAN. Method 100 then proceeds to step 116, in which the ticket purchase is completed using the IAN. The digits in the instant account number may, for example, correspond to the digits that will appear on a transaction card that will be issued to the applicant and linked to the newly created credit account, or may be an entirely different account number.

To ensure that the applicant uses the ticket purchased in the applicant's name, the purchased ticket may be prevented from being renamed or resold. One way of preventing renaming or resale of the ticket is to associate a flag with the ticket in a ticketing system of the partner airline agency. The flag will alert representatives of the partner airline agency that requests to change the name on the ticket should be denied.

After the ticket purchase is completed in step 116, method 100 proceeds to step 128.

In airline security agent lane 106, in step 128, the applicant checks in at the airport of departure. In step 130, an airport security agent verifies that the name of the passenger using the ticket is the same as the name of the applicant. This may be done, for example, by comparing the name on the airline ticket with the name on the passenger's identification. The verification by the airport security agent is utilized to ensure that a third party cannot fraudulently open an account under the applicant's name, and then attempt use the newly opened account for the third party's benefit. Method 100 then ends at step 132.

Figure 2:
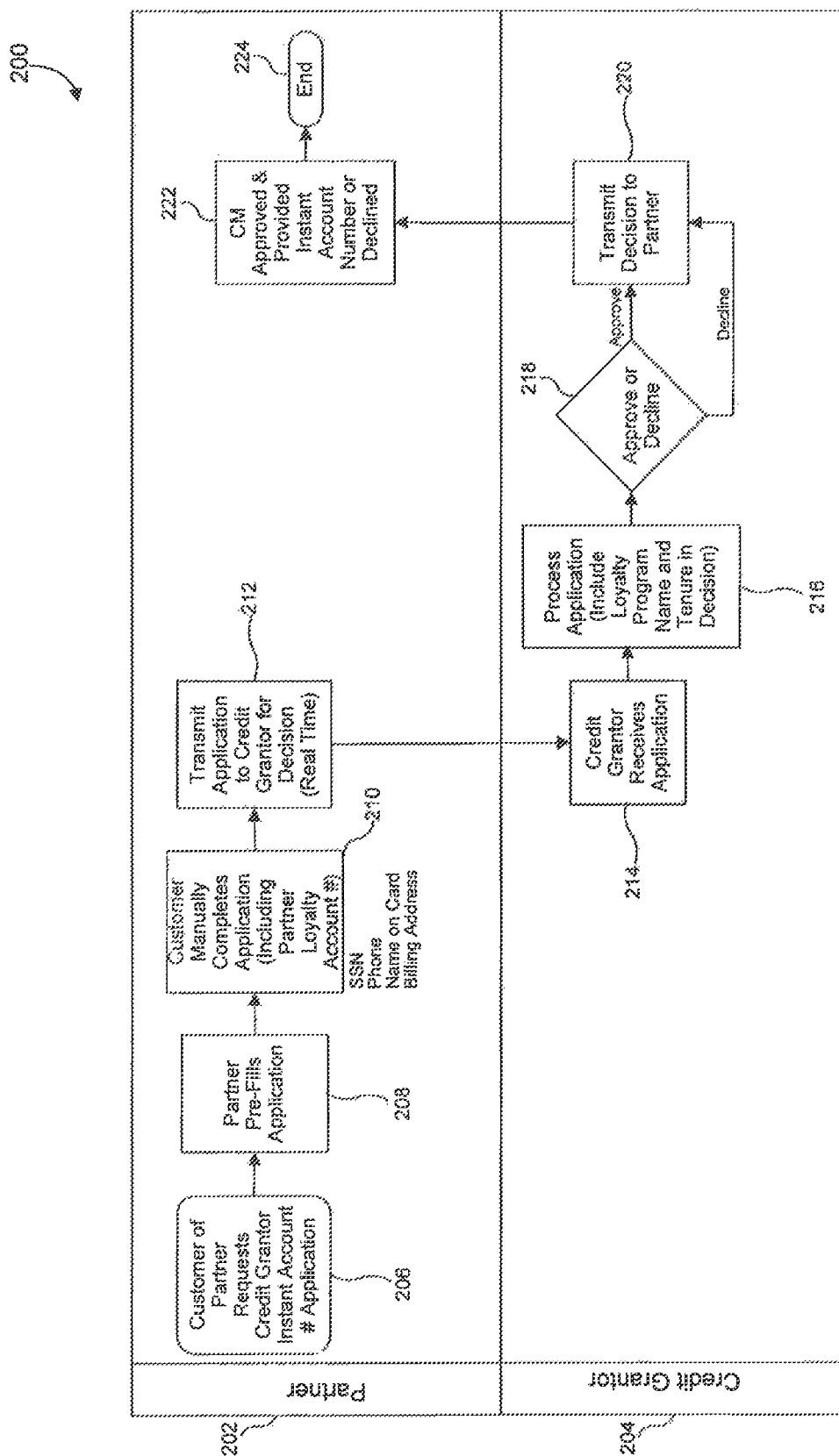
FIG. 2 is a flowchart of an example method of controlling fraud when an IAN is issued in conjunction with a partner service provider's loyalty or rewards program.

FIG. 2 is a flowchart illustrating an example fraud control method 200 used when an IAN is issued in conjunction with a loyalty or rewards program of a partner service provider (hereinafter, partner). The partner may be, for example, an airline or hotel, and the rewards program may be, for example, a frequent flyer or frequent guest program. In method 200, the applicant's account information used for the partner's rewards program is captured by a credit grantor. Use of existing rewards account information ensures that the applicant has some tenure (e.g., connection) with the partner, and that the data submitted in the instant credit application is consistent with the applicant's data on file with the partner. Fraud control is achieved because the perpetrator of the fraud would have to compromise (e.g., illegally obtain) data from the partner, as well as personal information about the intended victim. FIG. 2 is divided into two lanes 202 and 204. As with FIG. 1, each lane is assigned to a different party (partner and credit grantor), and steps that are illustrated in a particular lane are performed by the respective party. Partner lane 202 includes steps that are taken by the partner. Credit grantor lane 204 includes steps that are taken by the credit grantor.

Method 200 begins with step 206 in partner lane 202, in which the customer of the partner requests an application for an IAN from the credit grantor. Such a request may be made in conjunction with, for example and without limitation, an airline ticket reservation or a lodging reservation. Method 200 then proceeds to step 208.

In step 208, the partner pre-fills the instant credit application, for example based on information from the rewards account associated with the applicant. In step 210, the applicant completes any additional information requested by the instant credit application. Information on the instant credit application may include, for example and without limitation, the partner rewards account number, the applicant's social security number, the name of the applicant, and the billing address of the applicant. Such information may be entered by one or both of the partner or the applicant. Once the application is complete, method 200 proceeds to step 212.

In step 212, the partner transmits the instant credit application to the credit grantor for a decision, which can be done in real time.

In credit grantor lane 204, in step 214 the credit grantor receives the instant credit application transmitted from the partner.

In step 216, the application is processed by the credit grantor according to the standard operating procedures of the credit grantor. The rewards program name and tenure of the applicant with the rewards program may be considered in the decision. Additionally, information about the applicant from the partner's rewards program may be processed for comparison with information entered by the applicant on the instant credit application. Since it is presumed that only the owner of the partner's rewards account has access to the rewards account, the identity of the applicant is confirmed by the partner before the application for instant credit is made.

In step 218, the credit grantor either approves or declines the instant credit application.

If the credit grantor declines the instant credit application, method 200 proceeds to step 220. In step 220, the credit grantor transmits a declination decision to the partner, which can then be communicated to the applicant.

If the credit grantor approves the instant credit application in step 218, method 200 proceeds to step 220. In step 220, an approval decision is transmitted to the partner by the credit grantor. Once either the declination or approval decision has been transmitted to the partner, method 200 proceeds to step 222.

Again, in partner lane 202, in step 222, if the instant credit application was declined (e.g., a declination decision was transmitted to the partner), the customer is notified of the declination. If the instant credit application was approved (e.g., an approval decision was transmitted to the partner), the customer is provided with the IAN. Method 200 ends with step 224.

In one example, the customer can then use the IAN to complete a purchase. The purchase may be, for example without limitation, a reservation for an airline ticket or lodging.

III. Example Implementations

The present invention (e.g., methods 100 or 200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
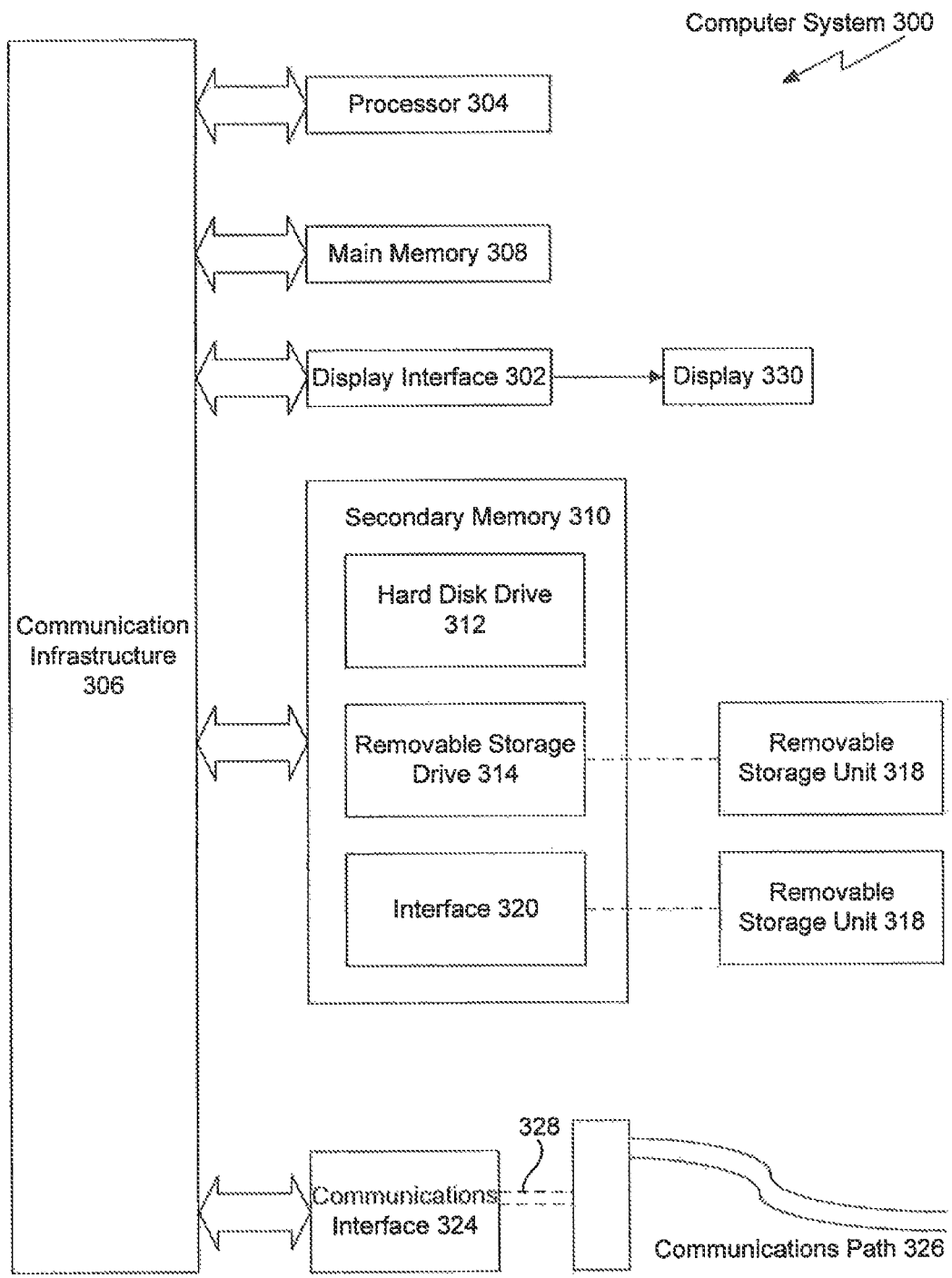
FIG. 3 is a block diagram of an exemplary computer system useful for implementing embodiments of the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 318 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 318 and interfaces 320, which allow software and data to be transferred from the removable storage unit 318 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card international Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 314 or a hard disk installed in hard disk drive 312. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising;
   receiving, by a computer based system for issuing a transaction account, a transaction account application containing information about an applicant;
   developing, by the computer based system, a transaction account application authorization decision based on the transaction account application and at least one of a tenure of the applicant in a third party rewards program with respect to an issuer of the transaction account and a comparison of applicant provided transaction account application information and information associated with the rewards program; and
   indicating, by the computer based system and in response to the authorization decision, approval of the transaction account application.

2. The method of claim 1, wherein the applicant is from an airline ticketing agency.

3. The method of claim 2, further comprising offering, by the computer based system, the transaction account to the applicant in response to the applicant making a reservation with the airline ticketing agency.

4. The method of claim 1, further comprising providing, by the computer based system, a transaction account code in response to the authorization decision.

5. The method of claim 4, further comprising limiting, by the computer based system, an airline ticket purchased in the applicant's name using the transaction account code to not be renamed or resold, such that the name on the ticket can be compared with the name of the applicant associated with the transaction account code if the applicant attempts to use the ticket.

6. The method of claim 5, wherein the limiting comprises flagging the airline ticket in a reservation system of the airline ticketing agency to indicate that the ticket cannot be renamed or resold.

7. The method of claim 4, wherein the transaction account code is used to purchase an airline ticket from the airline ticketing agency.

8. The method of claim 1, wherein the transaction account application is received from a database of an airline ticketing agency.

9. The method of claim 1, wherein the transaction account application contains information received from at least one of an airline ticketing agency or information received from the applicant.

10. A method comprising:
    receiving, by a computer based system for issuing a transaction account, a transaction account application containing information about an applicant from a partner service provider, wherein the applicant has a rewards program account sponsored by the partner service provider;
    developing, by the computer based system, a transaction account authorization decision based on at least one of information associated with the rewards program, tenure of the applicant in a third party rewards program with respect to a transaction account issuer provided by the partner service provider, and a comparison of applicant provided instant transaction account application information and information associated with the rewards program account of the applicant; and
    indicating, by the computer based system and in response to the authorization decision, approval of the transaction account application.

11. The method of claim 10, wherein the transaction account is used to purchase an airline ticket or make a lodging reservation.

12. The method of claim 10, wherein the transaction account application contains information received from a database of the partner service provider.

13. The method of claim 10, wherein the transaction account application contains information received from the partner service provider or information entered by the applicant.

14. The method of claim 10, wherein the information associated with the rewards program comprises a name of the rewards program.

15. A system comprising:
a processor;
a non-transitory memory having instructions stored thereon that, in response to execution by the processor, cause the processor system to perform operations comprising:
receiving a transaction account application containing information about an applicant for a transaction account;
developing a transaction account application authorization decision based on at least one of a tenure of the applicant in a third party rewards program with respect to an issuer of the transaction account and a comparison of applicant provided transaction account application information and information associated with the rewards program; and
indicating, in response to the authorization decision, approval of the transaction account application.

16. The system of claim 15, wherein the transaction account is usable to purchase an airline ticket from an airline ticketing agency.

17. The system of claim 15, wherein the operations further comprise offering the transaction account to the applicant while the applicant makes a reservation with an airline ticketing agency.

18. The system of claim 15, wherein the transaction account application is received from an airline ticketing agency or the transaction account application contains information received from the airline ticketing agency.

19. The system of claim 15, wherein the operations further comprise limiting an airline ticket purchased in the applicant's name using a transaction account code to not be renamed or resold, such that the name on the ticket can be compared with a name of a passenger if the passenger attempts to use the ticket.

* * * * *